United States Patent

Shepherd

[11] 4,107,557
[45] Aug. 15, 1978

[54] SULFUR-FUELED MAGNETOHYDRODYNAMIC POWER GENERATION

[75] Inventor: Thomas L. Shepherd, Essex Fells, N.J.

[73] Assignee: Airco, Inc., Montvale, N.J.

[21] Appl. No.: 784,001

[22] Filed: Apr. 4, 1977

[51] Int. Cl.² .............................................. H02N 4/02
[52] U.S. Cl. .................................................... 310/11
[58] Field of Search .......................... 310/10, 11, 4, 2

[56] References Cited

U.S. PATENT DOCUMENTS

| | | | |
|---|---|---|---|
| 3,379,903 | 4/1968 | Rosner | 310/11 |
| 3,394,555 | 7/1968 | Lafleur | 310/11 X |
| 3,439,195 | 4/1969 | Rummel | 310/11 |
| 3,439,196 | 4/1969 | Hals | 310/11 |
| 3,471,723 | 10/1969 | Maslan | 310/11 |
| 3,531,664 | 9/1970 | Hals | 310/11 |
| 3,531,665 | 9/1970 | Rosa | 310/11 |
| 3,546,499 | 12/1970 | Somers | 310/11 |
| 3,720,850 | 3/1973 | Way | 310/11 |
| 3,873,860 | 3/1975 | Bergman et al. | 310/11 |
| 4,064,222 | 12/1977 | Bretz | 310/11 X |

FOREIGN PATENT DOCUMENTS

| | | | |
|---|---|---|---|
| 1,029,347 | 5/1966 | United Kingdom | 310/11 |

Primary Examiner—Donovan F. Duggan
Attorney, Agent, or Firm—David L. Rae; Larry R. Cassett; Edmund W. Bopp

[57] ABSTRACT

An improved, closed-cycle magnetohydrodynamic (MHD) power generation system wherein the MHD generator is fueled by sulfur burned in oxygen, together with stages for recovering sulfur dioxide, reducing $SO_2$ to elemental sulfur, and returning reduced elemental sulfur to the MHD unit such that higher flame temperatures and ionization factors are obtained while pollutants typically generated by fossil-fueled MHD power generation systems are essentially eliminated.

20 Claims, 2 Drawing Figures

SULFUR-FUELED MAGNETOHYDRODYNAMIC POWER GENERATION

FIELD OF THE INVENTION

The present invention relates to improvements in the field of magnetohydrodynamic power generation systems.

BACKGROUND OF THE INVENTION

The fundamental principles of magnetohydrodynamic (MHD) power generation are well known in the art. Reduced to essentials, an MHD generator operates by exposing a high-velocity stream of partially ionized gas to a transverse magnetic field, which separates the positive and negative ions; these positive and negative components are passed between electrodes, generating an electromotive force, which is then available for use.

A factor (parameter) which directly controls the power output of an MHD generator is the "ionization factor," which is defined as the ratio of ionized to neutral atoms within the gas stream. The dependence of the ionization factor $(n_i/n_n)$ on the temperature of the gas is expressed by the Saha equation:

$$\frac{n_i}{n_n} \approx 2.4 \times 10^{15} \frac{T^{3/2}}{n_i} e^{-U_i/kT}$$

where
$U_i$ = ionization temperature of the gas
$k$ = Boltzmann's constant
$T$ = temperature in kelvins The foregoing expression indicates the desirability of developing as high a flame temperature as possible in order to maximize the higher ionization factor of a particular gas. As the electromotive force generated is a linear function of the number of ions collected on the electrodes per unit time, the power generated is essentially proportional to the number of ions produced, and hence, the flame temperature.

An alternative or additional method of improving the ionization factor $n_i/n_n$ is to reduce $U_i$ — that is, to use a material having lower ionization energy as the source of ions (i.e., a "seed") than that used as fuel. In such a case, the energy provided by the combustion of the fuel ionizes the seed material as, for example, is described in U.S. Pat. No. 3,873,860.

Typical prior art MHD power generation systems operate on an open cycle; that is, the fuel used is burned once, usually in air or oxygen. The exhaust product is then released to the atmosphere, and typically contains undesirable pollutants, such as $SO_2$, CO, and the like. While attempts have been made to scrub the exhaust of such systems (e.g., U.S. Pat. No. 3,379,903), it would be preferable to provide a closed-cycle MHD power generation system which emits no pollutants as part of its plan of operation; in this way undesirable emissions could be reduced, theoretically, to zero.

A further difficulty with such prior art MHD power generation systems is that fossil fuels such as coal or oil are generally required. Presently known sources of these and other fossil fuels are not unlimited and it is therefore desirable to provide a power generation system which does not rely on the continued supply of such materials.

OBJECTS OF THE INVENTION

It is therefore an object of the invention to provide an improved MHD power generation system.

A further object of the invention is to provide an MHD generation system which operates at higher flame temperatures than have been utilized in prior art MHD systems.

Yet a further object of the invention is to provide a closed-cycle MHD power generation system which releases minimal pollutants to the atmosphere.

Still a further object of the invention is to provide an energy-producing system which is fueled by a non-fossil fuel.

Other objects of the invention will appear to those skilled in the art upon examination of the following description and the claims and drawings attached thereto.

SUMMARY OF THE INVENTION

The present invention relates to an MHD generator comprising a burning chamber in which sulfur is burned with oxygen at a temperature upwards of 8000° F with an additive of a readily ionizable seed material, to form a partially ionized stream of $SO_2$ and seed material, means for supplying a magnetic field to separate the positive and negative components of the ion stream, and electrodes to collect the electromotive force produced across the ion stream. If used in a closed-loop generation system, the $SO_2$ and seed material are then passed into a reduction apparatus comprising means for reacting carbon with $SO_2$ to reduce $SO_2$ into elemental sulfur and carbon dioxide, and means for separating the elemental sulfur and carbon dioxide from each other. Means are then provided to return the reduced elemental sulfur and seed to the MHD generator for recombustion.

It is envisioned that the carbon required for the reduction of $SO_2$ is to be provided by conventional processes, such as pyrolysis of industrial, municipal, animal, and vegetable wastes, to yield "char." This form of carbon is suitable for the $SO_2$ reduction step. Accordingly, sulfur is used as a fuel, although essentially no $SO_2$ is released to the atmosphere. The primary off-product so released is carbon dioxide which is essentially inert, and the only major continuing input to the system of the invention is the waste material mentioned above, a non-fossil fuel not likely ever to be in short supply.

BRIEF DESCRIPTION OF THE DRAWINGS

The invention will be more clearly understood by reference to the following description of exemplary embodiments thereof in conjunction with the following drawing in which.

DESCRIPTION OF THE PREFERRED EMBODIMENTS

Figure 1:
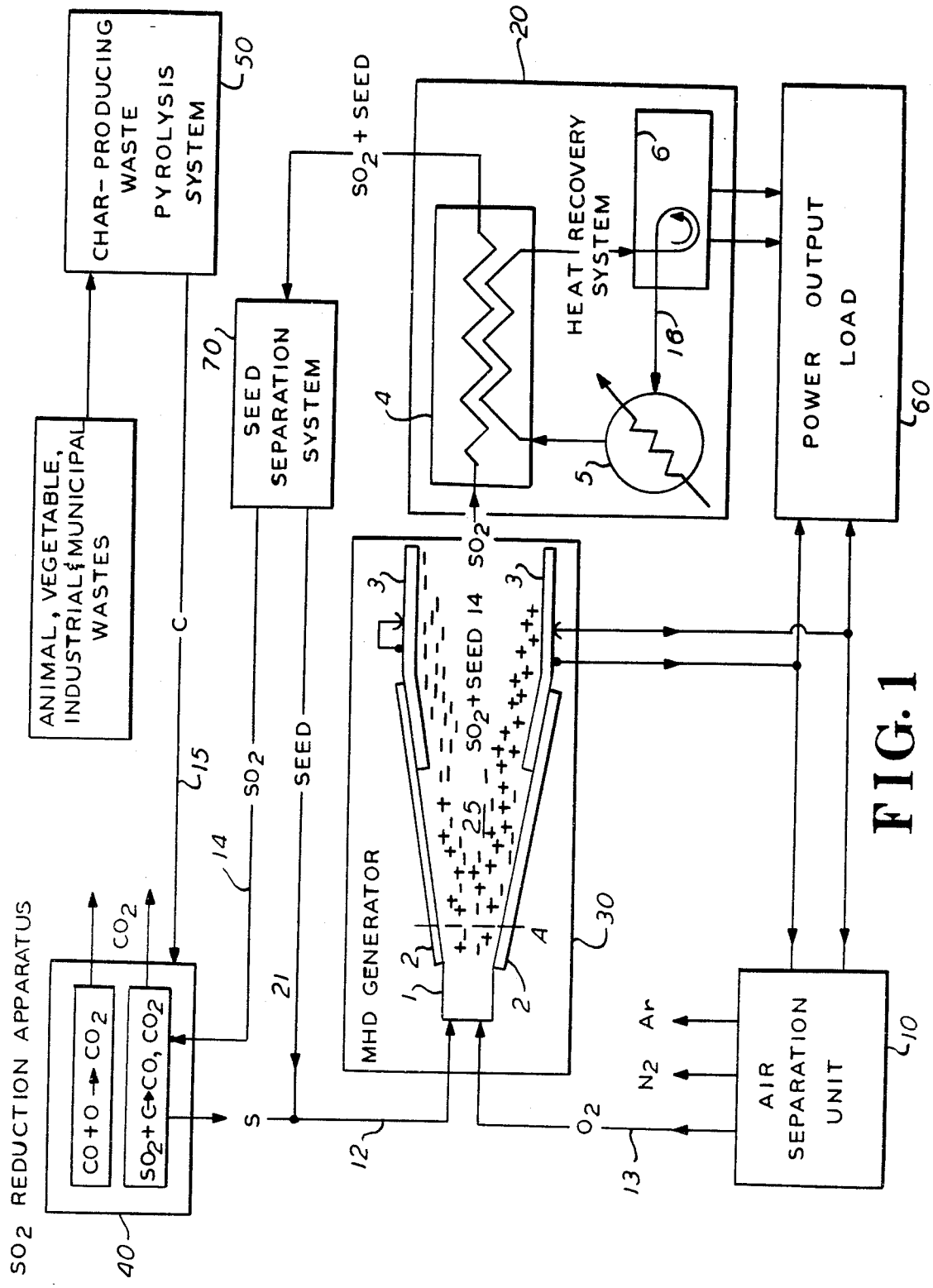
FIG. 1 represents schematically an exemplary embodiment of a magnetohydrodynamic power generation system of the invention.

Referring now to FIG. 1, there is illustrated an exemplary embodiment of the MHD power generation system according to the present invention, which comprises MHD generator 30, air separation unit 10, excess heat recovery system 20, SO₂ reduction unit 40, seed separation system 70, and pyrolysis system 50.

Subsystem 30, which may comprise a conventional MHD generator, is provided with conduits 13 and 12 for supplying oxygen and sulfur thereto. Preferably, oxygen is supplied in gaseous form together with liquid sulfur to burner 1 of the type disclosed in U.S. Pat. Nos. 3,092,166 and 3,693,815, which are assigned to the assignee of the present invention, and wherein liquid sulfur is atomized and combusted with oxygen to produce a flame temperature calculated to be approximately 5300K (9100° F).

Figure 2:
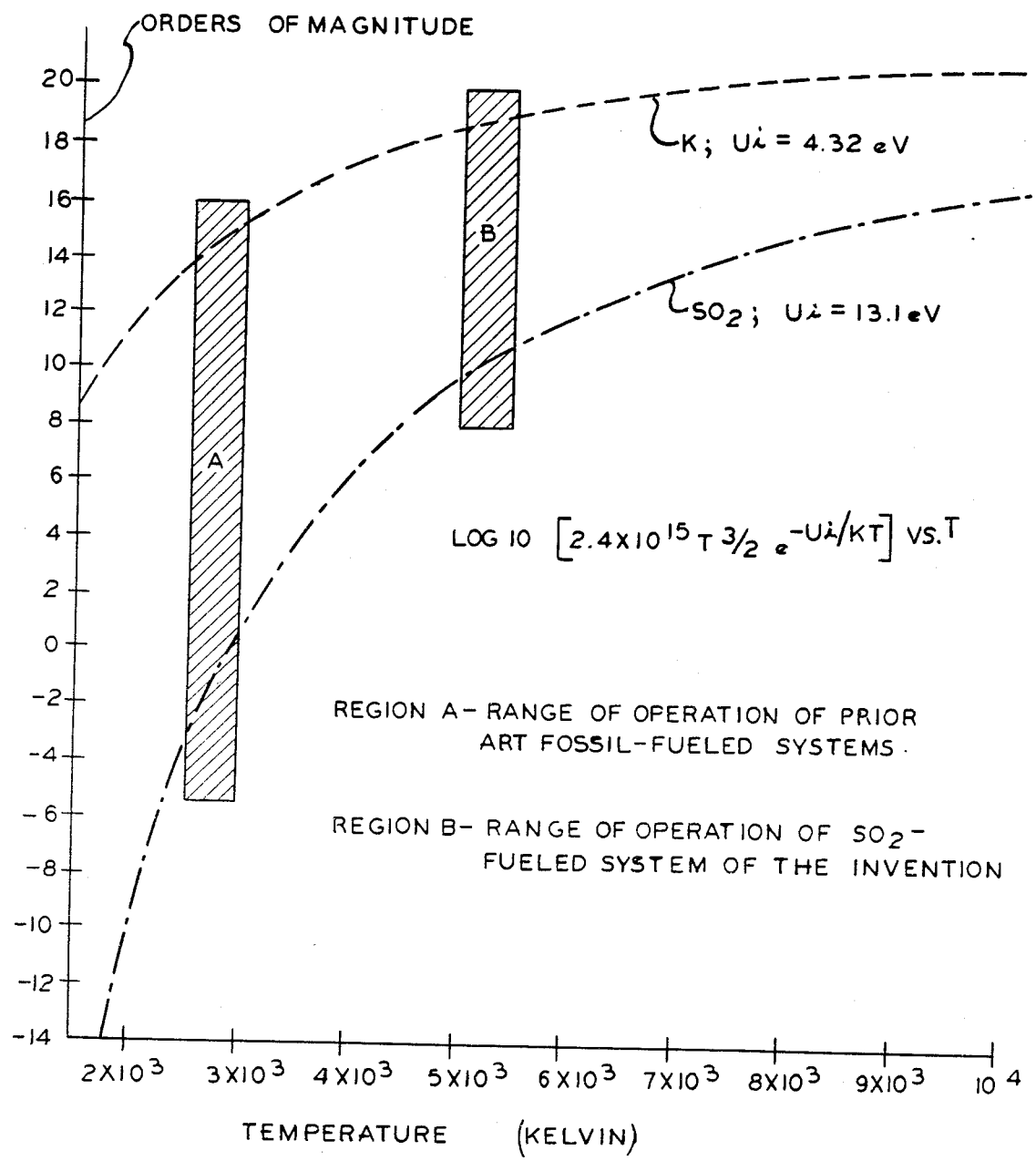
FIG. 2 is a graph showing ionization as a function of temperature.

FIG. 2 illustrates the advantages provided by this high flame temperature, and by provision of a seed material. The line marked "$SO_2$" plots the logarithm of the ionization function described by the Saha equation noted earlier taking 13.1eV, the ionization energy of $SO_2$, as $U_i$, versus temperature between 2000 and 10,000K. The line marked K plots a similar function using 4.32eV, the ionization potential of potassium, a suitable seed. Prior art MHD systems typically use the combustion of coal or oil at temperatures in the 2500–3000K (region "A") as the source of ionization energy; a sulfur-burning MHD system as taught by the present invention operates at approximately 5300K (region "B"). It will be observed that there is a difference of roughly 12 orders of magnitude of the ionization factor between the regions A and B on the "$SO_2$" curve, and one of roughly five orders on the "K" curve. It will thus be apparent that high flame temperature and seed materials are of advantage in MHD power generation.

A further advantage provided by the use of sulfur for fuel as opposed to oil or coal is that these fossil fuels, when burned in air or oxygen, tend to produce highly corrosive silica and alumina fly-ash which frequently causes difficulty with the maintenance of the integrity of the electrodes and of any insulators that may be used in the combustion chamber. By comparison, "dry" $SO_2$ (i.e., $SO_2$ containing essentially no water vapor) is a non-corrosive material which is simple to pipe and control.

Referring again to FIG. 1, the stream of ions resulting from the combustion of sulfur and oxygen is separated into positive and negative components by the application of a magnetic field generated by electromagnet 2, the strength of which field may be on the order of 10kGauss. Electromagnet 2 may take the form of a conventional magnet or may be constructed of superconductive material, so as to economize operating costs through savings in power consumed by the magnet. The structure of electromagnet 2 is not shown in FIG. 1, as it is not thought necessary to an understanding of the invention, although an MHD generator utilizing a superconducting magnet as the source of the magnetic field is known in the art as, for example, is illustrated in U.S. Pat. No. 3,280,530.

The function described by the Saha equation also exhibits an inverse dependence on $n_i$, the density of ions. This is due to the recombination of positive with negative ions, which occurs more frequently at higher densities. The application of the magnetic field may prevent the recombination of the ions; if, for example, a density $n_i$ is chosen so as to completely ionize the gas at a point A, the magnetic field may then be so contoured as to keep the two ion-streams separate. It is calculated that, using a seed material, a suitable density would be approximately $3 \times 10^{20}$ atoms/cc; by comparison, the density of atoms in air at atmospheric pressure is approximately $3 \times 10^{19}$ atoms/cc. The stream of ions would thus be at a pressure of approximately 150 psi.

The ion stream, having thus been separated, then passes between electrodes 3 across which an electromotive force is generated and may be utilized simply by attaching cables to electrodes 3. The MHD generator as thus described can be made to produce either alternating or direct current through control of the magnetic field. By cyclically reversing the field in time ac will be produced while dc will be produced by maintaining a steady magnetic field.

According to the teaching of the present invention, there will be available at orifice 14 of burner 1 a stream of hot $SO_2$ gas. Rather than waste the heat in this stream, an excess heat recovery system 20, comprising typically a heat exchanger 4, wherein the $SO_2$ heats water to form steam, a steam turbine 6, to produce electrical or mechanical power from said steam, and a condenser 5, to cool the steam back to water, may be employed. It will be apparent to those skilled in the art that, possibly apart from the material of which the $SO_2$ circulation tubes in heat exchanger 4 are made, excess heat recovery system 20 is entirely conventional.

Seed separation system 70 is effective in known manner to separate the seed material, typically an element in one of the first three groups of the Periodic Table, from the stream of $SO_2$. System 70 may be of conventional design and may take the form of apparatus described in U.S. Pat. No. 3,337,759. The separated seed material is then recycled to burner 1, typically via tubes 21 and 12, and is reused. In this way, only a limited amount of seed material need be provided for continuous operation of the MHD system of the invention.

The stream of $SO_2$ is then passed, preferably in the gaseous state, through tube 14 to $SO_2$ reduction unit 40 wherein the gaseous $SO_2$ is brought into contact with carbon and is reduced to sulfur and to compounds of carbon and oxygen, most notably carbon monoxide and dioxide. $SO_2$ reduction unit 40 may be of essentially conventional design and a suitable unit is described in Kertamus et al, "Process for $SO_2$/Char Reaction," *Hydrocarbon Processing*, vol. 53, no. 2, February 1974, pp 95 – 96. Table I shows the most likely reactions to occur as a function of the temperature within $SO_2$ reduction unit 40.

TABLE I

| Operating Temperature | Most Likely Reaction |
|---|---|
| T < 800K | $SO_2 + C \rightarrow CO_2 + S$ |
| 800K < T < 1000K | $2SO_2 + 3C \rightarrow CO_2 + 2COS$ |
| T < 1000K | $SO_2 + 2C \rightarrow 2CO + S$ |

Inasmuch as thermodynamic equilibrium conditions are unlikely to be obtained within $SO_2$ reduction unit 40, all the reactions listed in Table I are likely to occur simultaneously and it may be necessary to take further steps to separate out the reaction products. Upon such separation, CO and COS can be burned to form $CO_2$ and $SO_2$, respectively; the $CO_2$ can be collected and sold, and the $SO_2$ can be recycled through the $SO_2$ reduction unit 40. In this way, only essentially pure $CO_2$ will eventually be vented to atmosphere.

The sulfur produced in $SO_2$ reduction unit 40 is returned via pipe 12 to MHD generator 30. Advantageously, the sulfur will at all times be heated to a temperature somewhat above its melting point (approximately 250° F), so as to ease its transport. Accordingly, it will be seen that comsumption of sulfur by the power generation system of the invention is limited only by the efficiency of the apparatus; sulfur is used as a reusable working fluid, rather than as a non-recoverable fuel.

It will be apparent that the sulfur need not be directly recycled to burner 1 as a supply of sulfur may be maintained in a reservoir. If it were desired for any reason, the $SO_2$ could be stored and elemental sulfur, which is commercially available, could be directly introduced into burner 1; alternatively, should a large market for $SO_2$ develop, it could be gathered, after having the seed separated out, and sold.

From the above description, those skilled in the art will recognize that the system of the invention is a closed-cycle, highly efficient MHD power generation system which is not environmentally damaging. Other components of such a system as exemplified by FIG. 1 are a pyrolysis unit 50, used to supply char to $SO_2$ reduction unit 40, and an air separation unit 10, used to supply oxygen to the MHD generator 30. Neither of these components are necessary to the operation of an MHD power generation system as taught by the present invention — for example, ordinary coal or coke could replace the pyrolysis-produced char — but they are within its scope and are shown for completeness.

Pyrolysis unit 50 may comprise one of a number of conventional systems which convert industrial, municipal, vegetable, and animal wastes into, among other things, char, a carbon form similar to charcoal, suitable for use in $SO_2$ reduction apparatus 40. It is desirable that the char be as free of water vapor as possible, so that little if any sulfuric acid ($H_2SO_4$) is formed be reaction of the $SO_2$ with water. A number of suitable pyrolysis processes have been developed; see, for details, Bryson, "Garbage Power," *Machine Design,* vol. 47, no 1, January 1974, pp 20 – 26. It will be apparent that such pyrolysis apparatus 50 must not, of necessity, be located in close proximity to MHD generator 30, as char is readily transportable. Alternatively, the pyrolysis process may be eliminated and coke or coal be used in $SO_2$ reduction apparatus 40.

Similarly, air separation unit 10, which may be of entirely conventional design, while shown as powered by the output of the MHD generator 30, could be located elsewhere, and the oxygen shown carried to burner 1 by tube 13, supplied from commercial sources. It is envisioned, though, that an air separation unit 10 might conveniently be located on the same premises as the MHD generator, so as to be directly powered thereby, and that the other products of air separation unit 10, primarily nitrogen and argon, could be utilized for other purposes, as is now common commercial practice.

It is calculated that approximately 30% of the electrical power generated by the MHD unit of the invention would be required to distill the oxygen necessary for the combustion process while the remaining 70% is available for use at load 60. The energy generated in heat recovery system 20 is included in this calculation.

It will be seen that the sulfur-fueled MHD power generation system of the invention fulfills the objectives of the art listed above and, as shown graphically in FIG. 2, is more efficient than prior art systems, due to the higher flame temperature produced by combustion of sulfur in oxygen. As shown schematically in FIG. 1, the system according to the invention is a closed-cycle system, which releases minimal or no environmentally undesirable effluents to the atmosphere, and requires no fossil fuels for operation. The sole continuing system input (in one embodiment) is wastes of all kinds, and its output is electrical power and useful gases.

It will no doubt be apparent to those skilled in the art that numerous modifications can be made to the invention without departing from the spirit and scope of the following claims.

I claim:

1. A magnetohydrodynamic power generation system comprising:
   a combustion chamber;
   means for supplying elemental sulfur and oxygen to said combustion chamber wherein said sulfur is burned in said oxygen, forming sulfur dioxide, to generate a flame temperature of at least 8000° F and to produce a stream of positive ions and electrons;
   means for separating said positive ions from said electrons; and
   electrode means for separately collecting said positive ions and said electrons, thereby developing an electromotive force across said electrode means.

2. The system of claim 1 further comprising sulfur dioxide collection means and means in communication with said collection means for reducing said sulfur dioxide, through contact with carbon, to sulfur and compounds of carbon and oxygen.

3. The system of claim 2 wherein said carbon is produced through the reduction of one or more waste materials essentially consisting of industrial, municipal, animal, and vegetable wastes.

4. The system of claim 2 further comprising means for reintroducing said sulfur reduced from said sulfur dioxide into said combustion chamber for recombustion.

5. The system of claim 1 wherein said sulfur is introduced into the combustion chamber in the liquid state.

6. The system of claim 1 further comprising means for introducing an ionizable seed material into said combustion chamber.

7. The system of claim 6 wherein said seed material is an element selected from Groups I - III of the Periodic Table of Elements.

8. The system of claim 6 further comprising means for recovering said seed material from the combustion chamber and for returning said recovered seed material to said means for introducing said seed material into said combustion chamber.

9. The system of claim 1 further comprising means for converting at least part of the heat generated in said combustion chamber into electrical or mechanical energy.

10. A closed-cycle magnetohydrodynamic power generation system comprising:
    a combustion chamber;
    means for separately supplying elemental sulfur and oxygen to said combustion chamber wherein said sulfur is combusted in said oxygen to thereby produce a sulfur dioxide combustion product and positive ions and electrons;
    magnet means to separate said positive ions from said electrons;
    electrode means for separately collecting said positive ions and electrons, thereby generating an electromotive force across said electrode means;
    reduction means for reducing said sulfur dioxide to sulfur and compounds of carbon and oxygen; and
    means for recovering and returning said sulfur produced by said reduction means to said combustion chamber.

11. The system of claim 10 wherein the sulfur is introduced to the combustion chamber in liquid form.

12. The system of claim 10 further comprising means for introducing an ionizable seed material into said combustion chamber and means for recovering said seed material from said combustion product and for returning said seed material to said introducing means for reionization.

13. The system of claim 10 further comprising means for converting at least part of the heat generated in said combustion chamber into electrical or mechanical energy.

14. A method for the generation of electrical power, comprising:
   combusting a stream of elemental sulfur in oxygen in a combustion chamber, to produce a combustion product having a temperature not less than 8000° F;
   exposing a stream of atoms of a seed material to the heat of combustion, to produce a stream of ions and electrons;
   applying a magnetic field to said stream of ions and electrons to separate them into positive and negative components;
   collecting said positive and negative components on electrodes;
   separating the seed material from the combustion product;
   reducing the combustion product to elemental sulfur;
   returning said reduced sulfur to the combustion chamber for recombustion;
   returning said separated seed material to the combustion chamber for reionization; and
   recovering at least part of the heat of the combustion product in means for conversion of heat to electrical power.

15. The method of claim 14 wherein the sulfur is supplied to the combustion chamber in liquid form.

16. The method of claim 14 wherein said seed material is an element selected from Groups I – III of the Periodic Table of Elements.

17. A method of generating electrical power comprising the steps of:
   supplying elemental sulfur and gaseous oxygen to the combustion chamber of a magnetohydrodynamic power generation system;
   burning said sulfur in said oxygen to generate a flame temperature of at least 8000° F and thereby producing a stream of positive ions and electrons; and
   separating said positive ions from said electrons and collecting said positive ions and electrons on respective electrodes to generate an electromotive force thereacross.

18. A method as defined in claim 17 further comprising the steps of:
   recovering sulfur dioxide from said combustion chamber;
   reducing said recovered sulfur dioxide to elemental sulfur; and
   returning said reduced sulfur to said combustion chamber.

19. A method as defined in claim 17 further comprising the step of exposing a stream of a readily-ionizable seed material to the heat of combustion to produce additional ions and electrons.

20. The method of claim 19 in which said seed material is an element selected from Groups I – III of the Periodic Table of Elements.

* * * * *